United States Patent [19]
Hayashi

[11] Patent Number: 5,550,588
[45] Date of Patent: Aug. 27, 1996

[54] DATA INPUT DEVICE AND DATA INPUT METHOD FOR INPUTTING IMAGE DATA FROM CAMERA TO MEMORY

[75] Inventor: Hisao Hayashi, Tokyo, Japan

[73] Assignee: NEC Corporation, Japan

[21] Appl. No.: 456,227

[22] Filed: May 31, 1995

[30] Foreign Application Priority Data

Jun. 2, 1994 [JP] Japan .................................. 6-120982

[51] Int. Cl.⁶ ........................................................ H04N 5/76
[52] U.S. Cl. ........................................... 348/231; 348/373
[58] Field of Search ................................. 348/222, 231, 348/373, 714, 716; 358/906; H04N 5/228, 5/225, 5/76

[56] References Cited

U.S. PATENT DOCUMENTS

4,939,580  7/1990  Ishikawa ................................. 348/373

Primary Examiner—Safet Metjahic
Assistant Examiner—Sherrie Hsia
Attorney, Agent, or Firm—Ostrolenk, Faber, Gerb & Soffen, LLP

[57] ABSTRACT

A set of image data of an object is picked up by a camera installed on a camera mount. The camera has a variable shooting angle in accordance with an operational state of the camera mount. A sensor system senses the operational state of the camera mount to detect the shooting angle of the camera. A write device receiving the image data from the camera writes to store the image data in an image memory, in accordance with a selected order from among a plurality of programmed orders of a write access to the image memory, depending on an output of the sensor system, so that an inverted image of the object when picked up by the camera is inverted when the image data are stored in the image memory.

8 Claims, 7 Drawing Sheets

|  | i=1 | | | i=N |
|---|---|---|---|---|
| j=1 | P(1,1) | P(1,2) | ------ | P(1,N) |
|  | P(2,1) | P(2,2) | ------ | P(2,N) |
|  | ⋮ | ⋮ | | ⋮ |
| j=M | P(M,1) | P(M,2) | ------ | P(M,N) |

|  | i=1 | | | i=N |
|---|---|---|---|---|
| k=1 | Q(1,1) | Q(1,2) | ------ | Q(1,N) |
|  | Q(2,1) | Q(2,2) | ------ | Q(2,N) |
|  | ⋮ | ⋮ | | ⋮ |
| k=M | Q(M,1) | Q(M,2) | ------ | Q(M,N) |

DATA INPUT DEVICE AND DATA INPUT METHOD FOR INPUTTING IMAGE DATA FROM CAMERA TO MEMORY

BACKGROUND OF THE INVENTION

The present invention relates to a data input device and a data input method. More particularly, the invention relates to a data input device and a data input method for inputting a set of image data from a camera, where they are picked up, to an image memory, where they are stored at addressed locations.

DESCRIPTION OF THE RELATED ART

Recent years have observed an increasing tendency to open a television conference among local stations. The local stations each include a camera for sequentially shooting associated transient images, such as a temporal sequence of transient expressions of an attendant or of a front, perspective or top view of a material having printed or written information thereon in the form of an illustration, a tabulation, a phrase, etc.

In a typical station, the camera is implemented to permit a sole attendant to voluntarily change a shooting position thereof at least between a horizontal position, such as when shooting an expression of the attendant or a front view of a material pinned to a vertical board behind the attendant, and a downward position, such as when shooting a material put on a desk in front of the attendant who is reading or watching the material. Each shot is transduced by the camera into a set of image data, which data are sequentially stored in an image memory, wherefrom they are selectively read to be transmitted to other stations.

In most cases, such the implementation includes a camera mount with a pivotable arm.

Figure 1A:
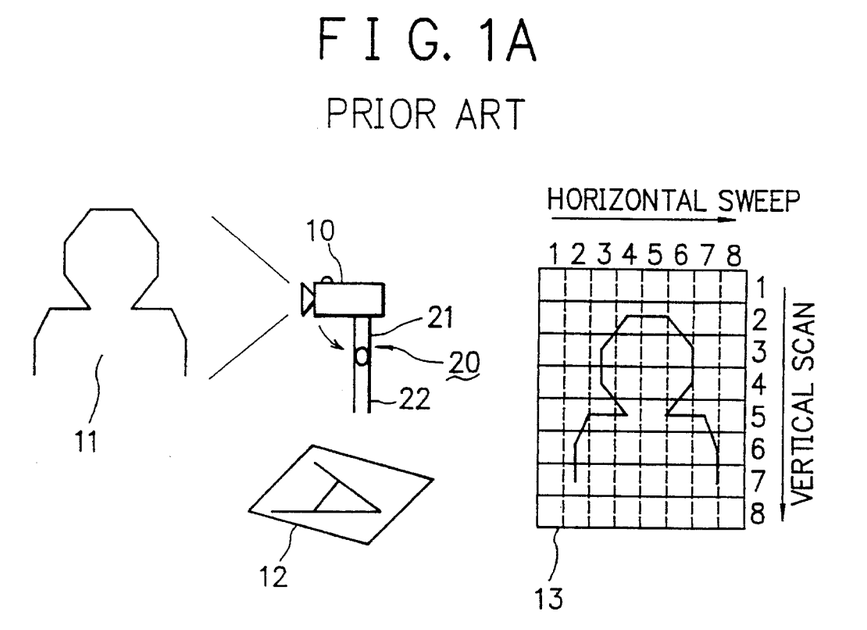
FIGS. 1A and 1B are illustarations describing, in pair, how to use a conventional camera mount and how to apply a conventional data input method to a set of image data picked up by a camera fixed on the camera mount.
Figure 1B:
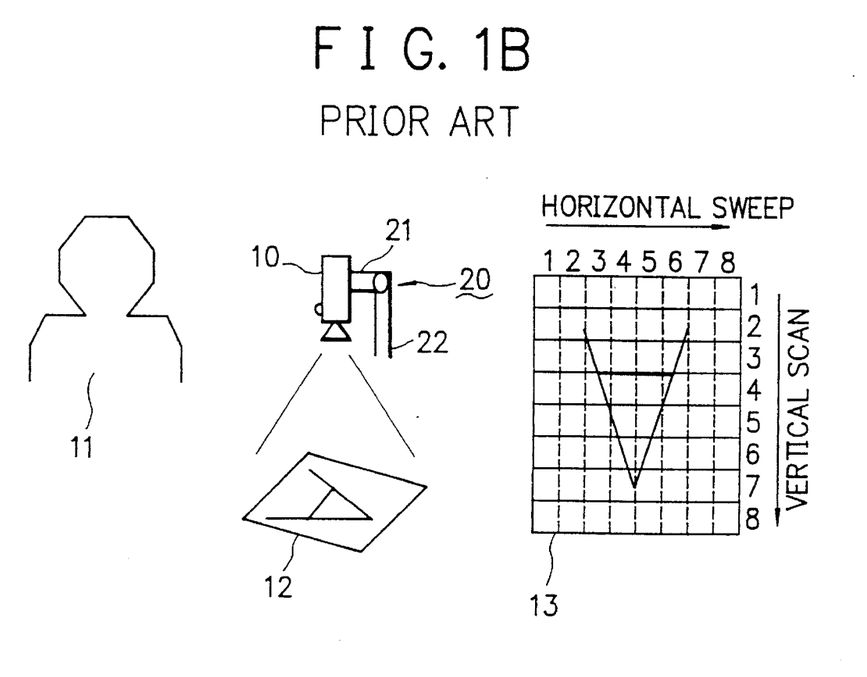

FIGS. 1A and 1B illustrate, in pair, the use of a conventional camera mount and an application of a conventional data input method.

Designated at character 20 is the camera mount, which may be weighty for a person to remove by one hand, as a camera 10 is mounted thereon. The mount 20 has an arm 21 pivoted at an elbow end thereof to a waist end of a leg 22, so that the arm 21 is forwardly pivotable from an upright position shown in FIG. 1A to a forward fall position shown in FIG. 1B.

In the upright position of the arm 21, the camera 10 mounted on a palm end of the arm 21 has a horizontal position, i.e. a 0-degree elevation or a 0-degree dip in respect of a focal centerline of the camera 10, where it shoots a transient expression of an attendant 11 who is looking at a printed letter "A" on a material 12 put on an unshown desk in front of him or her. When viewed from the attendant 11, the material 12 has a top side thereof at a far end and a bottom side thereof at a near end.

In the forward fall position of the arm 21, the camera 10 has a down-looking position, i.e. a 90-degree dip, where it shoots a top view of the material 12. The camera 10 may have a declined position to shoot a perspective view of the material 12. In the top view, the material 12 has the top side at a near end to the leg 22 of the camera mount 20 and the bottom side at a far end therefrom.

In the case of FIG. 1A, the expression of the attendant 11 is picked up by the camera 10, where it is transduced into a set of image data, which data are scanned out and processed to be sequentially stored in an image memory 13, where they are two-dimensionally allocated in accordance with a programmed write access order, in which a horizontal sweep along a row of matrix-addressed memory elements is repeated every row in a predetermined sense of a vertical scan, exemplarily from a top row, e.g. a 1-th row, to a bottom row, e.g. an 8-th row. The horizontal sweep has a sense thereof predetermined to be exemplarily from a head address at a leftmost element, eg. a (1, 1) element in the 1-th row, to an end address at a rightmost element, eg. a (1, 8) element in the 1-th row. Accordingly, an erect image of the attendant 11 is picked up and stored as it is. A programmed read access order to the memory 13 will permit a set of stored data of the erect image to be sequentially read and transmitted, as necessary.

In the case of FIG. 1B, the top view of the material 12 is picked up by the camera 10, and in like course to FIG. 1A, a set of associated data is stored in the memory 13. As a result, an inverted image "∀" of the material 12 is picked up and stored as it is. Therefore, the programmed read access order will faithfully read to transmit a set of stored data of the inverted image.

To avoid the latter case, there have been employed two solutions: (1) the use of a pair of exclusive cameras either for shooting an erect image and the other for shooting an inverted image; and (2) the provision of a modified camera mount for permitting a single camera to shoot both erect and inverted images.

The solution (1) may result in a complicated system that may be unaccetable to some local stations.

Figure 2A:
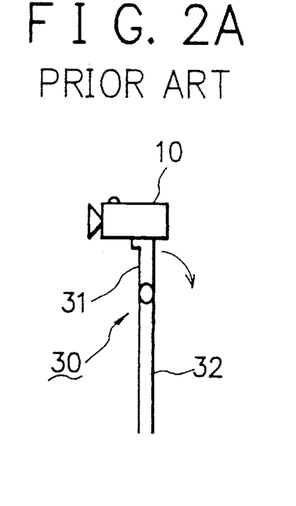
FIGS. 2A, 2B and 2C are illustrations describing, in series, how to use a camera mount according to a conventional example.
Figure 2B:
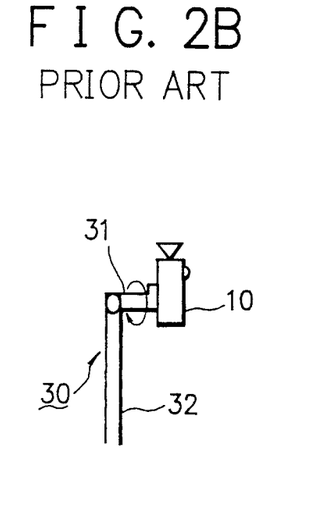
Figure 2C:
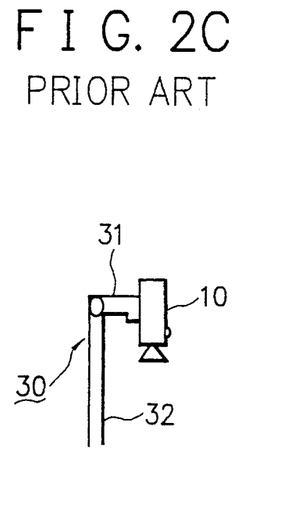

FIGS. 2A, 2B and 2C illustrate, in series, how to use a camera mount according to a conventional example of the solution (2).

Designated at character 30 is the camera mount. The mount 30 has an arm 31 for mounting a camera 10 on a palm end thereof. The arm 31 is pivoted at an elbow end thereof to a waist end of a leg 32 of the mount 30, in a swingable manner between an upright position shown in FIG. 2A and a rearward fall position shown in FIG. 2B and additionally in a rotatable manner about a centerline of the arm 31 in the rearward fall position to have an inverted fall position shown in FIG. 2C.

With the arm 31 set in the upright position in FIG. 2A, the camera 10 has a horizontal position, i.e. a 0-degree elevation or a 0-degree dip. With the arm 31 swung into the rearward fall position in FIG. 2B, the camera 10 has an up-looking position, i.e. a 90-degree elevation. With the arm 31 rotated into the inverted fall position in FIG. 2C, the camera 10 has an inverted down-looking position, i.e. a 90-degree dip in a mirror image. The camera 10 is operable in the position of FIG. 2A to shoot an erect image and in the position of FIG. 2C to shoot an inverted image. Accordingly, the camera 10 is permitted to pick up a set of data of an erect image, even when shooting a material put on a desk.

Figure 3A:
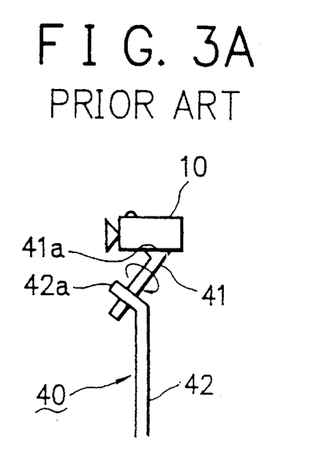
FIGS. 3A and 3B are illustrations describing, in pair, how to use a camera mount according to another conventional example.
Figure 3B:
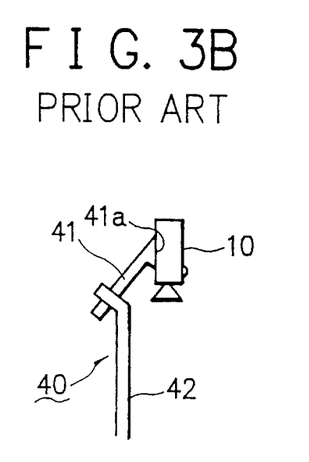

FIGS. 3A and 3B illustrate, in pair, how to use a camera mount according to another conventional example of the solution (2).

Designated at character 40 is the camera mount. The mount 40 is composed of an arm 41 and a leg 42. The leg 42 is provided with an inclined part 42a at a waist end thereof. The inclined part 42a has an offset angle of 45 degrees relative to a vertical centerline of the leg 42. The arm 41 is rotatably fitted at an elbow end thereof to the inclined part 42a. An axis of the arm 41 is set to be perpendicular to the inclined part 42a. The arm 41 has at a palm end thereof a mount face 41a for mounting thereon a camera 10. The mount face 41a has a cross angle of 45 degrees to the axis of the arm 41.

In a normal position of the arm 41 shown in FIG. 3A, the mount face 41*a* is horizontal so that the camera 10 put in a horizontal position is permitted to shoot an erect image of an attendant. In a rotated position of the arm 41 shown in FIG. 3B, the mount face 41*a* is vertical so that the camera 10 put in an inverted down-looking position is permitted to shoot an erect image of a material put on a desk.

The two typical examples of the solution (2) may however be both troublesome to a sole attendant who is responsible to a shooting angle of a camera, when compared with the case of FIGS. 1A and 1B.

Still less, the examples described each need a replacement of a camera mount.

The present invention has been achieved with such points in mind.

SUMMARY OF THE INVENTION

It is therefore an object of the present invention to provide a data input device and a data input method for inputting a set of image data from a camera to an image memory, permitting a set of data of an erect image to be automatically stored in the memory, with a simple operation for changing a shooting position of the camera, without the need of giving an inverted down-looking position to the camera.

To achieve the object, a genus of the present invention provides a data input device for inputting to an image memory a set of image data of an object picked up by and received from a camera installed on a camera mount, while the camera has a shooting angle thereof variable in accordance with an operational state of the camera mount.

The data input device according to the genus of the invention comprises a sensor means and a write means.

The sensor means senses the operational state of the camera mount to thereby detect the shooting angle of the camera. The write means writes to store the image data in the image memory, in accordance with a selected order from among a plurality of defined orders of a write access to the image memory, depending on an output of the sensor means, so that an inverted image of the object when picked up by the camera is inverted when the image data are stored in the image memory.

According to the genus of the invention, therefore, an inverted image of an object when picked up by a camera is permitted to be automatically inverted when a set of image data are stored in an image memory, with a simple operation for changing a shooting position of the camera, without the need of giving an inverted down-looking position to the camera.

According to a species of the genus of the invention, the image memory is addressed in a matrix form with a number of rows and a number of columns. The defined orders of the write access include a first access order in which the rows of the matrix are accessed in accordance with a given order thereof, and a second access order in which they are accessed in a reverse order to the given order. The write means has, as the selected order, the first access order when the shooting angle of the camera is substantially equal to a dip of zero degrees, and the second access order when that is substantially equal to a dip of a right angle.

According to an individual of the species of the invention, the columns in each row of the matrix are accessed, in the first access order, in accordance with a predetermined order thereof and, in the second access order, in a reverse order to the predetermined order so that the inverted image of the object when picked up by the camera is inverted and reversed when the image data are stored in the image memory.

According to another species of the genus of the invention, the camera mount has a pivotable arm member for supporting the camera, and the operational state of the camera mount is defined by a declination of the arm member.

According to another species of the genus of the invention, the write means comprises a dual-port memory, a control means, an address generator and an input-output means. The dual-port memory stores therein the image data received from the camera. The control means has therein the defined orders of the write access, for responding to the output of the sensor means to determine as the selected order one of the defined orders. The address generator responds to the selected order to generate a sequence of addresses designating a plurality of memory locations in the dual-port memory and another sequence of addresses designating a plurality of memory locations in the image memory. The input-output means inputs therein the image data as a datastream from the designated memory locations in the dual-port memory, and outputs therefrom the datastream to the designated memory locations in the image memory.

Moreover, to achieve the object described, another genus of the invention provides a data input method for inputting to an image memory a set of image data of an object picked up by and received from a camera installed on a camera mount, while the camera has a shooting angle thereof variable in accordance with an operational state of the camera mount.

The data input method according to this genus of the invention comprises two steps.

In a first step, the operational state of the camera mount is sensed, thereby detecting the shooting angle of the camera. In a second step, the image data are written to be stored in the image memory, in accordance with a selected order from among a plurality of defined orders of a write access to the image memory, depending on a result of the sensing in the first step, so that an inverted image of the object when picked up by the camera is inverted when the image date are stored in the image memory.

According to this genus of the invention also, an inverted image of an object when picked up by a camera is permitted to be automatically inverted when a set of image data are stored in an image memory, with a simple operation for changing a shooting position of the camera, without the need of giving an inverted down-looking position to the camera.

According to a species of this genus of the invention, the data input method further comprises the steps of: addressing the image memory in a matrix form with a number of rows and a number of columns; having the defined orders of the write access, including a first access order in which the rows of the matrix are accessed in accordance with a given order thereof, and a second access order in which they are accessed in a reverse order to the given order; and having, as the selected order, the first access order when the shooting angle of the camera is substantially equal to a dip of zero degrees, and the second access order when that is substantially equal to a dip of a right angle.

According to an individual of the species of this genus of the invention, the columns in each row of the matrix are accessed, in the first access order, in accordance with a predetermined order thereof and, in the second access order, in a reverse order to the predetermined order so that the inverted image of the object when picked up by the camera is inverted and reversed when the image data are stored in the image memory.

BRIEF DESCRIPTION OF THE DRAWINGS

The objects, features and advantages of the present invention will become more apparent from consideration of the following detailed description, taken in conjunction with the accompanying drawings, in which.

DESCRIPTION OF THE PREFERRED EMBODIMENTS

There will be detailed below preferred embodiments of the present invention, with reference to FIGS. 4, 5A and 5B, 6A and 6B, 7A and 7B and 8. like members or items will be designated by like characters for the brevity of description.

Figure 4:
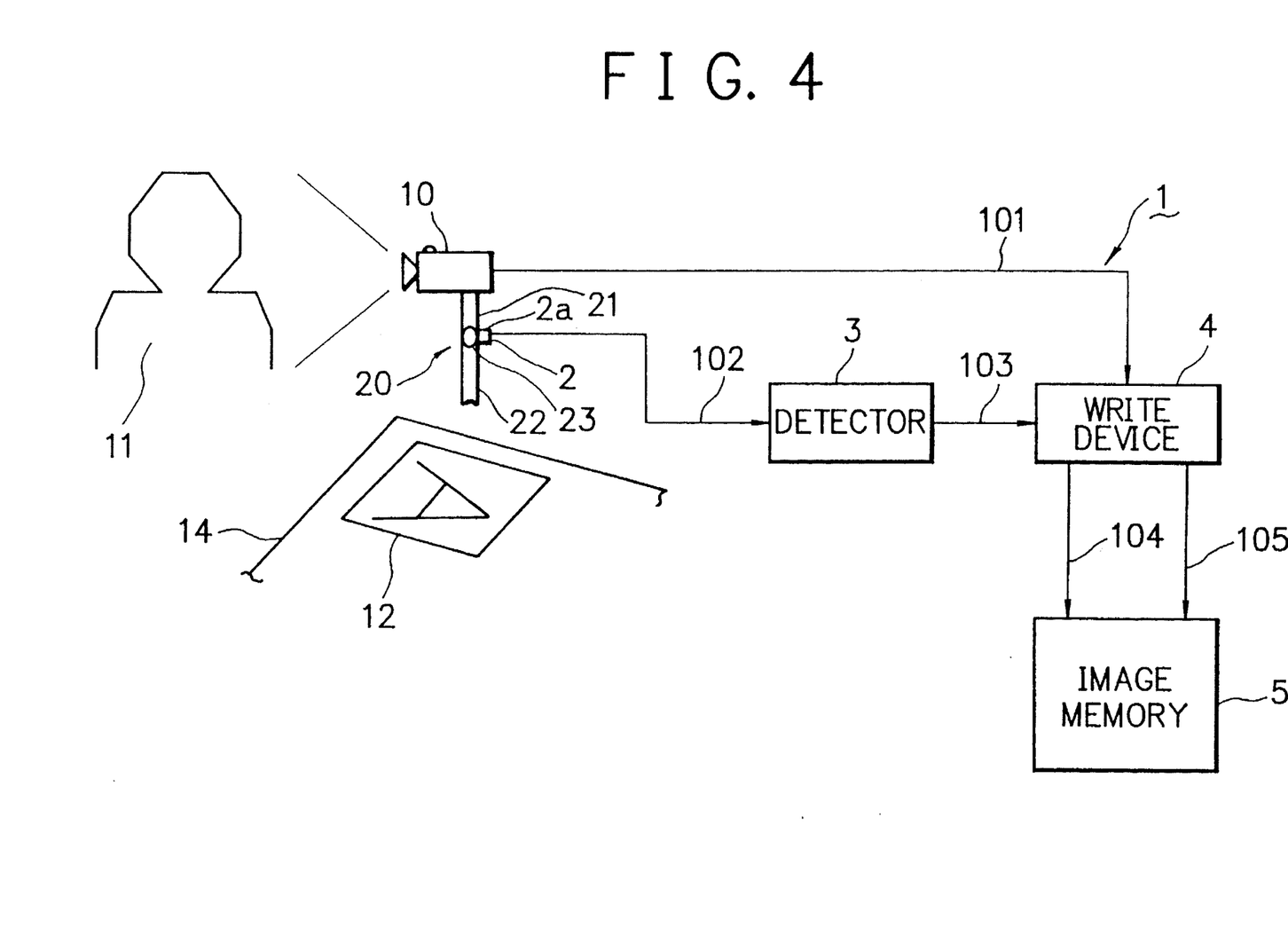
FIG. 4 is a block diagram of a data input device according to an embodiment of the invention.
Figure 5A:
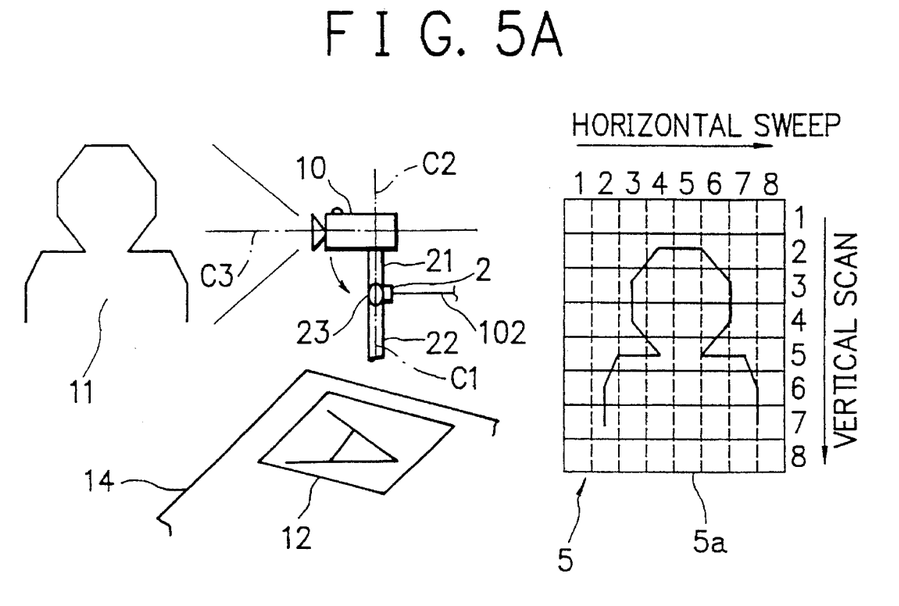
FIGS. 5A and 5B are illustarations describing, in pair, how to use a camera mount associated with the data input device of FIG. 4 and how to apply a data input method according to an embodiment of the invention to a set of image data picked up by a camera fixed on the camera mount.
Figure 5B:
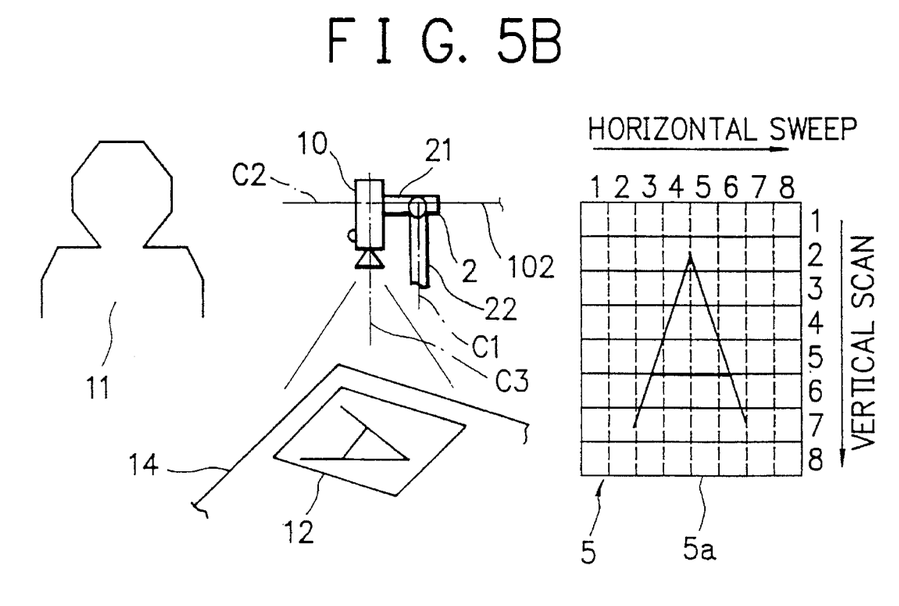

FIG. 4 as well as FIGS. 5A and 5B shows a data input device 1 according to an embodiment of the invention.

The data input device 1 is employed in a local station of a television conference system, where a weighty image pickup camera 10 is installed on a castered but still-standing camera mount 20, which is signle-hand-operable by a sole attendant 11 to have the camera 10 continuously shoot a transient image of an object, such as an expression or profile of the attendant 11, who may be seated to read a sheet of material 12 put on a desk 14 in front of him or her.

The camera 10 has a shooting angle, i.e. a dip of a focal centerline thereof. The shooting angle of the camera 10 is variable in accordance with an operational state of the camera mount 20, which state thus include information on the relative position that each picked up image of a voluntary object has to a frame position of the camera 10 which should preferably match to a natural sight of an observer, such as when the attendant 11 is an object, and to a current sight of the attendant 11, such as when the material 12 is an object. The attendant 11 may have an erect image thereof picked up by the camera 10 with a horizontal shooting angle corresponding to a natural sight of a dialogue partner. The material 12 may have an inverted image thereof picked up by the camera 10 with a declined or vertical shooting angle corresponding to a downward sight of a dialogue partner.

The transient image is instantaneously picked up by the camera 10, as a set of image data, which data are scanned out as a datastream 101, to be stored finally in an image memory 5.

The input device 1 comprises a sensor system consisting of a sensor 2 for sensing the operational state of the camera mount 20 to thereby detect the shooting angle of the camera 10 and for outputting an analog status signal 102 representative of the operational state of the mount 20 and a detector 3 for detecting one of a plurality of critical conditions of the status signal 102 to output a corresponding one 103 of a plurality of access order select commands, and a write device 4 for receiving the image data as the datastream 101 from the camera 10 and for outputting a sequence of address data 104 and the image data as a datastream 105 to the image memory 5, to thereby write or store the image data in the memory 5. The sensor 2 is provided with a mode select switch 2a for changing over a signal mode of the status signal 102 between a normal mode and a mirror mode. The write device 4 includes an internal memory or buffer for a temporary storage of received image data.

The sequence of address data 104 is generated at the write device 4 in accordance with a selected one of a plurality of programmed orders of a write access to the image memory 5, depending on the select command 103 outputted from the detector 3, so that an erect image of a voluntary object such as a transient expression of the attendant 11, when picked up by the camera 10, is kept as it is, when stored in the image memory 5, and that an inverted image of a voluntary object such as a top or bird-eye view of the material 12, when picked up by the camera 10, is inverted to have top and bottom sides thereof turned over, when the image data are stored in the memory 5.

The camera mount 20 has an arm 21 pivoted at an elbow end thereof to a waist end of a leg 22, by a pivot 23, so that the arm 21 is forwardly pivotable from an upward position shown in FIG. 5A to a forward fall position shown in FIG. 5B, while it may be latched at an intermediate declined position therebetween, if necessary.

The arm 21 may comprise a straight extending member rotatable about a vertical centerline of the leg 22. In that case, the mount 20 may stand aside the desk 14 or in far front of the attendant 11, beyond the desk 14, and may be manually or remote controlled by the attendant 11. The arm 21 may comprise an arcuate, curved or rectangular rotatable member having a perpendicularly extending portion in plan to the focal or longitudinal centerline of the camera 10. In this case, the mount 20 may stand near the desk 14 so that the attendant 11 can move the arm 21 by the left hand. In either case, the camera 10 can take a horizontal angle to shoot the attendant 11 from ahead or aside thereof, and a vertical or oblique angle to shoot the material 12 from thereabove or at a position off in an oblique direction. The leg 22 may also be rotatable about a longitudinal centerline thereof.

The sensor 2 is attached to the pivot 23 to sense a current position of the arm 21 to thereby detect a current dip of the camera 10. The sensor 2 may comprise an angle detector for detecting a current dip or inclination of the arm 21, directly or indirectly. The sensor 2 may comprise a signal detector for detecting an operation signal of the camera mount 20. The sensor 2 may be replaced by a photosensor for detecting a movement of a shadow of the arm 21, or by an image catcher for detecting a motion vector of a transient shadow of the arm 21 or the camera 10 itself.

As shown in FIG. 5A, with the arm 21 in the upward position, the camera 10 mounted on a palm end of the arm 21 has a horizontal angle equivalent to or near a dip of zero degrees, where it shoots a transient expression of the attendant 11 who may be looking at a printed letter "A" on the material 12 put on the desk 14. When viewed from the attendant 11, the material 12 has a top side thereof at a far end and a bottom side thereof at a near end. The palm end of the arm 21 may be rotatable about a longitudinal centerline of the arm 21.

Designated at character C1 is an imaginary longitudinal centerline of the leg 22, C2 is an imaginary longitudinal centerline of the arm 21, and C3 is an imaginary longitudinal centerline as the focal centerline of the camera 10. In the present embodiment, the shooting angle of the camera 10 is defined in terms of a dip that the focal centerline C3 has in side view to an unshown horizontal reference which may be an imaginary flat plane parallel to the ground. The shooting angle may be defined by a three-dimensional vector along the focal centerline C3, and a vertical component of the vector may be sensed by the sensor 2.

As shown in FIG. 5B, with the arm 21 in the forward fall position, the camera 10 has a bird-eye or down-looking angle within a dip range between from 45 degrees to 90 degrees or equivalent to or near a dip of 90 degrees, where it shoots a perspective or top view of the material 12, respectively. In the sight from the camera 10, the material 12 has the top side at a near end to a lower side of a frame of the camera 10 and the bottom side at a far end therefrom.

In the case of FIG. 5A, the expression as an erect image of the attendant 11 is picked up by the camera 10, where it is transduced into a two-dimensional set of image data, which data are raster-scanned to be output as the datastream 101 that is a sequence of pixel data. The sensor 2 senses the upward position of the arm 21, and outputs the status signal 102 in a normal condition in the normal mode to the detector 3, which detects the normal condition of the signal 102 to choose a normal command from among the select commands which may be read from a memory or programmed in a software or as a switching logic. The normal command is outputted as the select command 103 from the detector 3 to the write device 4, which thus receives the select command 103 substantially concurrently with or after reception of the datastream 101 from the camera 10. In use of a camera provided with a buffer, the write device 4 may receive the select command 103 before inputting therein the datastream 101.

The write device 4 responds to the normal command to generate a normal sequence of address data as the data 104 in synchronism with an internal clock, while concurrently and sequentially clocking out therefrom the address data in the normal sequence and the image data as the datastream 105 to the image memory 5, where the image data are stored to be two-dimensionally allocated in accordance with the normal sequence of address data.

The image memory 5 comprises a plurality of memory blocks each composed of a memory area 5a consisting of M×N memory elements E(m, n) addressed by an element-wise correspondent rectangular matrix {(m, n)} having M rows numbered from a 1-th to an M-th and N columns numbered from a 1-th to an N-th, where M and N are predetermined integers, respectively, and m and n are arbitrary integers such that 1≦m≦M and 1≦n≦N, respectively. Each memory block has a sufficient capacity for storing therein a complete set of image data picked up in each shot by the camera 10, so that the memory 5 is permitted to store therein a plurality of complete sets of image data corresponding to a temporal sequence of shots of the camera 10. However, for the convenience of illustration, the integers M and N are both assumed to be 8 in the embodiment.

Image data in each set are sequentially inputted as the datastream 105 in synchronism with the sequence of address data 104 into the image memory 5, where they have their accesses to the memory elements E(m,n) in the memory area 5a of a certain memory block in accordance with addresses (m,n) sequentially identified by the address data 104 and are written thereon, i.e. stored therein.

More specifically, along with the normal sequence of address data inputted to the image memory 5, all the memory elements E(m,n) that have their addresses (m,n) in the memory area 5a of a certain memory block are accessed in a normal write access order so that all the N elements (m, 1) to (m, N) in an arbitrary m-th row of the address matrix are covered by a normal horizontal sweep, where they are sequentially accessed in the order of their column numbers 1 to N, i.e. in a sense which monotonously increases the column number from a leftmost head address (m, 1) to a rightmost end address (m, N), and that all the M rows are covered by a normal vertical scan, where the nomal horizontal sweep is repeated to sequentially access the M rows in the order of row numbers thereof, i.e. in a sense which monotonously increases the row number from the top 1-th row to the bottom M-th row.

Accordingly, the image data of the erect image of the attendant 11 are stored, as they are, in the image memory 5. A programmed read access order to the memory 5 will permit a set of stored data of the erect image to be sequentially read and transmitted, as necessary.

In the case of FIG. 5B, an inverted image "∀" of the material 12 is picked up by the camera 10, and in like course to the case of FIG. 5A, a set of image data is output as the datastream 101 from the camera 10 to the write device 4. The sensor 2 senses the forward fall position of the arm 21, and outputs the status signal 102 in a critical condition in the normal mode to the detector 3, which responds to the critical condition to choose an inversion command from among the select commands. The inversion command is outputted as the select command 103 from the detector 3 to the write device 4.

The write device 4 responds to the inversion command to generate an inverted sequence of address data as the data 104, while clocking out therefrom the address data in the inverted sequence and the data of the inverted image "∀" as the datastream 105 to the image memory 5, where the data of the inverted image "∀" are stored to be two-dimensionally allocated in accordance with the inverted sequence of address data.

Namely, along with the inverted sequence of address data inputted to the image memory 5, all the memory elements E(m, n) in the memory area 5a of a certain memory block are accessed in an inverted write access order so that, although the N elements (m, 1) to (m, N) in an arbitrary m-th row are covered by the normal horizontal sweep as described, the M rows are then covered by an inverted vertical scan, where the nomal horizontal sweep is repeated to sequentially access the M rows in an opposite order to the order of row numbers thereof, i.e. in a sense which monotonously decreases the row number from the bottom M-th row to the top 1-th row.

Accordingly, the data of the inverted image "∀" of the material 12 are stored, as they are inverted, i.e. as if they were data of an erect image "A" of the material 12 in a mirror. The programmed read access order to the memory 5 will thus permit a set of stored data of that erect image to be sequentially read and transmitted.

The attendant 11 may operate the mode select switch 2a of the sensor 2 to change the signal mode of the status signal 102 from the normal mode to the mirror mode.

In that case, the sensor 2 outputs the status signal 102 in a normal condition in the mirror mode for the operational state of FIG. 5A, and in a critical condition in the mirror mode for the operational state of FIG. 5B.

The detector 3 responds to the normal condition in the mirror mode of the status signal 102 to choose a normal reverse command from among the select commands. To the critical condition in the mirror mode, the detector 3 is responsive to choose an inversion reverse command from among the select commands.

The write device 4 is responsive to the normal reverse command and the inversion reverse command to generate a mirrored sequence of address data and a reversed sequence of address data, respectively.

Along with the mirrored sequence of address data inputted to the image memory 5, the memory elements E(m, n) in the memory area 5a of a certain memory block are accessed in a mirrored access order so that the N elements (m, 1) to (m, N) in an arbitrary m-th row are covered by a reversed horizontal sweep, where they are sequentially accessed in an opposite order to the order of column numbers, i.e. in a sense which monotonously decreases the column number from a rightmost head address (m, N) to a leftmost end address (m, 1), while the M rows are covered by a normal vertical scan, where the reversed horizontal sweep is repeated to sequentially access the M rows in the order of row numbers. Accordingly, data of an erect image of an attendant looking a right partner may be stored as those of a mirror image, i.e. as if the attendant were looking a left partner. Further, the attendant 11 is effectively permitted to self-check his or her lateral movement or position by observing a realistic mirror image that may be displayed on a monitor connected to the image memory 5.

With the reversed sequence of address data inputted to the image memory 5, the memory elements E(m, n) are accessed in a reversed access order so that the N elements (m, 1) to (m, N) in an arbitrary m-th row are covered by the reversed horizontal sweep as described, and the M rows are covered by an inverted vertical scan, where the reversed horizontal sweep is repeated to sequentially access the M rows in an opposite order to the order of row numbers thereof, i.e. in a sense which monotonously decreases the row number from the bottom M-th row to the top 1-th row. Accordingly, data of an inverted image "∀" of the material 12 may be stored as those of a reversed or mirrored image of an erect image "A" in an opposite mirror, i.e. as those of a realistic erect image that may permit an attendant in another station to easily read a phrase or sentence in a transmitted image.

The detector 3 and/or the write device 4 may also have a mode select switch or a corresponding implement to permit a direct choice of the normal reverse command or the inversion reverse command in accordance with the signal state of the status signal 102, and/or a direct generation of the mirrored sequence of address data or the reversed sequence of address data in accordance with the select command 103.

The remaining FIGS. 6A and 6B, 7A and 7B and 8 show a block diagram and functions of a data input device 100 according to another embodiment of the invention.

Figure 6A:
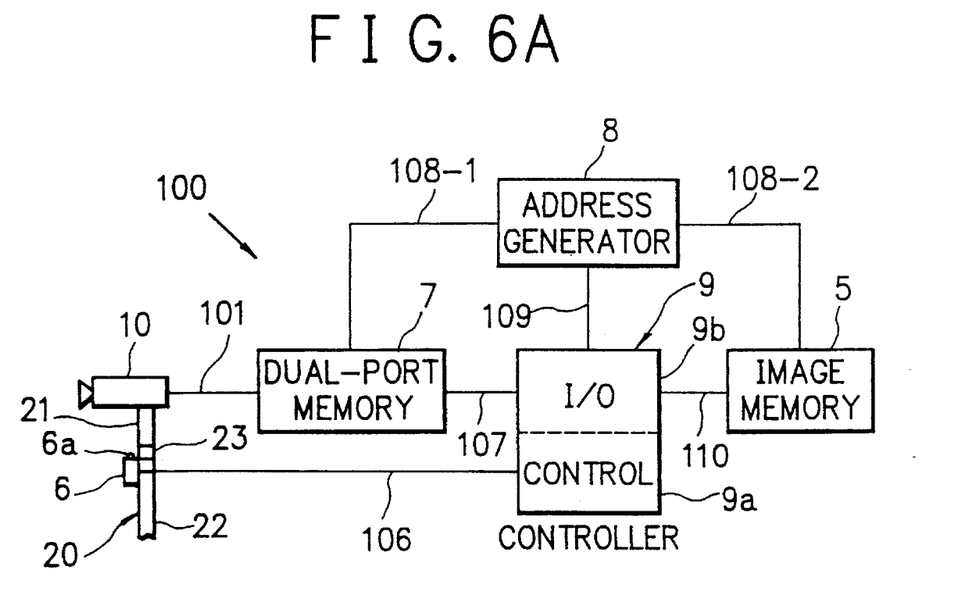
FIG. 6A is a block diagram of a data input device according to another embodiment of the invention.
Figure 6B:
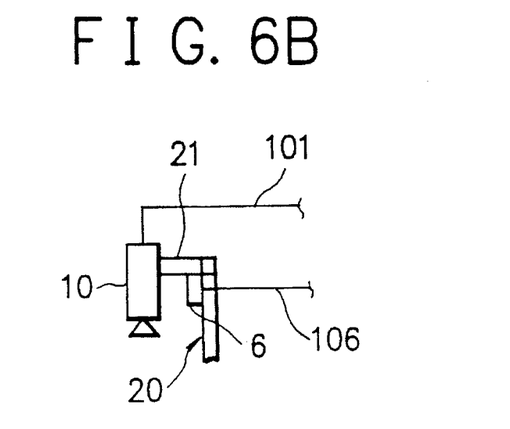
FIG. 6B is an illustration of a typical operational state of a camera mount associated with the data input device of FIG. 6A.

As will be seen from FIG. 6A, the data input device 100 in the present embodiment also is employed in a local station of a television conference system, where a camera 10 is installed on a camera mount 20. The camera 10 has a shooting angle thereof variable in accordance with an operational state of the camera mount 20. A transient image is picked up by the camera 10, as a set of two-dimensional image data, which data are raster-scanned to be outputted as a datastream 101 from the camera 10, for a temporary storage, before a final storing in an image memory 5.

The input device 100 comprises a sensor 6 as a support angle detection switch attached to the camera mount 20, and a writing system connected between the camera 10 and the image memory 5.

The sensor 6 is fixed on a front side at a waiste end of a leg 22 of the camera mount 20. The sensor 6 has a switch actuation piece 6a which is normally urged to a projecting position over a casing of the sensor 6, as shown in FIG. 6A, to be pushed down by a front side of an arm 21 of the camera mount 20, as the arm 21 is caused to pivot on a pivot 23 into a foward fall position thereof shown in FIG. 6B.

When the piece 6a is pushed down, an internal switch of the sensor 6 is actuated to turn on. While the arm 21 is held in a upward position shown in FIG. 6A, the piece 6a is kept in the projecting position, so that the internal switch remains off. The sensor 6a thus senses an operational state of the camera mount 20 to thereby detect the shooting angle of the camera 10, and outputs a status signal 106 as a control parameter representing the operational state of the mount 20, in terms of a parametric digital value $S_0$ to be 1 for an on-state of the internal switch and to be 0 for an off-state of the internal switch.

The writing system is composed of a dual-port memory 7, an address generator 8 and a controller 9 each working in synchronism with a system clock. The dual-port memory 7 is connected at a write terminal thereof to a data output terminal of the camera 10. The address generator 8 is connected at a pair of different address output terminals thereof either to both of respective address input terminals of the dual-port memory 7 and the image memory 5. The controller 9 consists of a control section 9a and an I/O (input-output) section 9b coupled with each other. The control section 9a is connected at a control parameter input terminal thereof to a signal output terminal of the sensor 6 and at a command output terminal thereof to a command input terminal of the address generator 8. The I/O section 9b is connected at a data input terminal thereof to a read terminal of the dual-port memory 7 and at a data output terminal thereof to a write terminal of the image memory 5.

The dual-port memory 7 serves to temporarily store therein a complete set of image data received from the camera 10 after each shot. The control section 9a is responsive to the parametric value $S_0$ of the status signal 106 inputted from the sensor 6 to choose a command from among a plurality of programmed access order select commands for a write access to the image memory 5, and outputs the chosen command as a command signal 109 to the address generator 8. The address generator 8 responds to the command signal 109 to generate a sequence of first address data for a read access to the dual-port memory 7 and a sequence of second address data for the write access to the image memory 5, while clocking out the first address data as a datastream 108-1 to the dual-port memory 7 and the second address data as a datastream 108-2 to the image memory 5. The I/O section 9b reads to input therein the image data as a datastream 107 from the the dual-port memory 7 in accodance with the sequence of first address data, and outputs the image data as a datastream 110 to the image memory 5, writing them therein in accordance with the sequence of second address data. The datastreams 107 and 110 are equivalent to each other in respect of the content of data, but may be different in phase from each other.

Figure 7A:
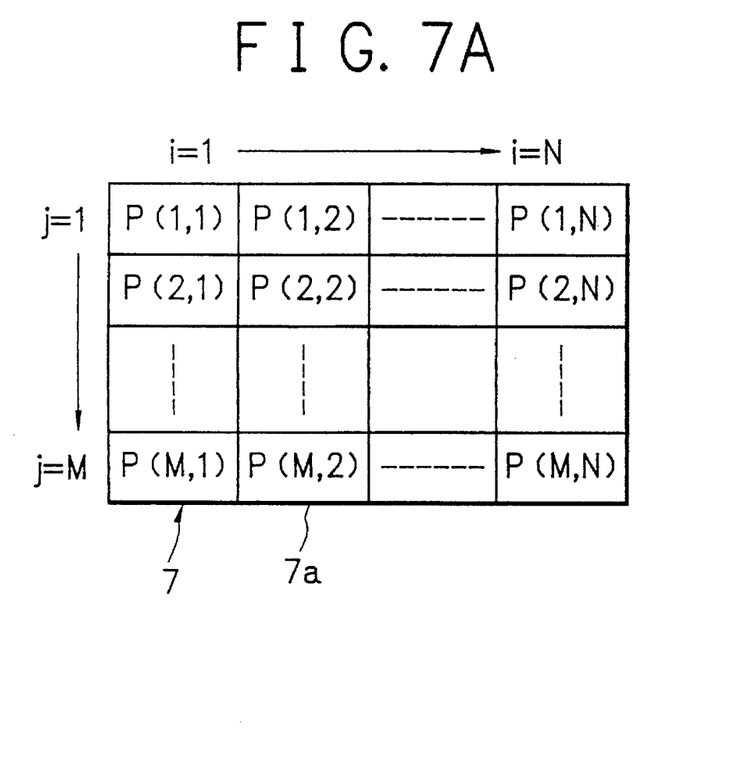
FIG. 7A is an imaginary map of a matrix-addressed memory area in a dual-port memory of the data input device of FIG. 6A.

As will be seen from FIG. 7A, the dual-port memory 7 comprises a plurality of memory blocks each composed of a memory area 7a consisting of M×N memory elements P(j, i) addressed by an element-wise correspondent rectangular matrix {(j, i)} having M rows numbered from a 1-th to an M-th and N columns numbered from a 1-th to an N-th, where j and i are arbitrary integers such that $1 \leq j \leq M$ and $1 \leq i \leq N$, respectively.

The image data temporarily stored in the memory area 7a at addresses (j, i) are sequentially read as the datastream 107 in accordance with a normal read access order defined by the sequence of first address data, so that N elements (j, 1) to (j, N) in an arbitrary j-th row of the address matrix are covered by a normal horizontal sweep shown by a rightward arrow in FIG. 7A, and M rows are covered by a normal vertical scan shown by a downward arrow in FIG. 7A.

Figure 7B:
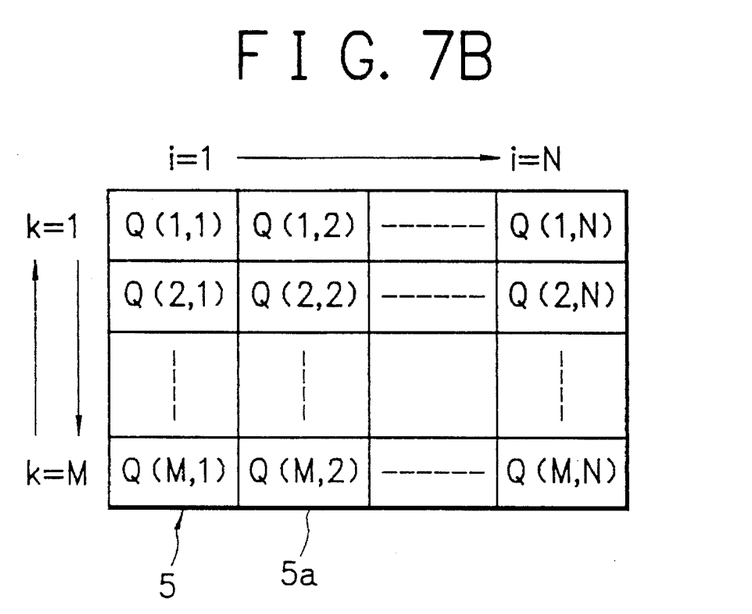
FIG. 7B is an imaginary map of a matrix-addressed memory area in an image memory of the data input device of FIG. 6A.

In the image memory 5, as in FIG. 7B, each memory area 5a consists of M×N memory elements Q(k, i) addressed by a rectangular matrix {(k, i)} having numbered M rows and N columns, where k is an arbitrary integer such that $1 \leq k \leq M$.

The image data sequentially read from the memory area 7a of the dual-port memory 7 are sequentially written to be stored in the memory area 5a at addresses (k, i) in accordance with a normal write access order defined by the sequence of second address data, so that N elements (k, 1) to (k, N) in an arbitrary k-th row are covered by a normal horizontal sweep shown by a rightward arrow in FIG. 7B irrespective of the parametric value $S_0$ of the status signal 106, and M rows are covered, if the value $S_0=0$ (off-state of the sensor 6), by a normal vertical scan shown by a downward arrow in FIG. 7B and, if the value $S_0=1$ (on-state of the sensor 6), by an inverted vertical scan shown by an upward arrow in FIG. 7B.

Figure 8:
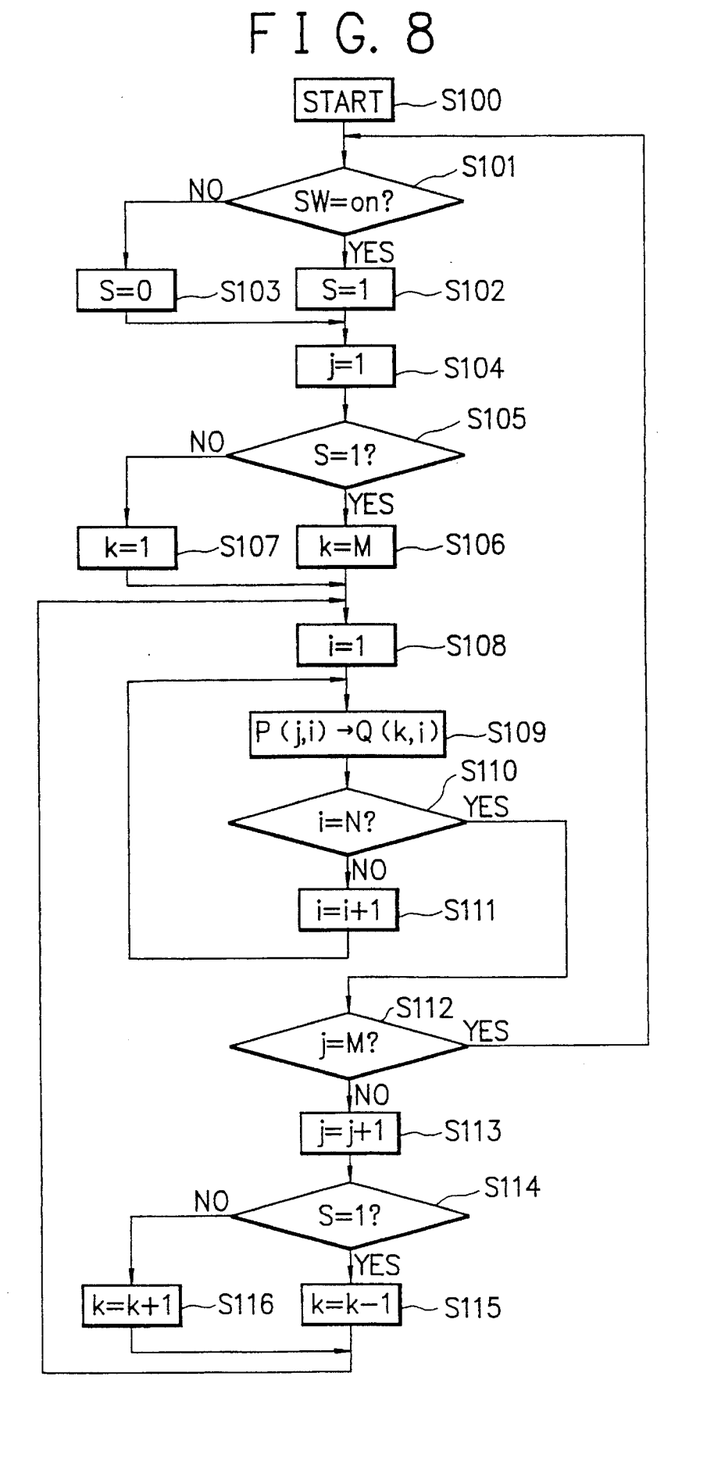
FIG. 8 is a flowchart describing a function of a controller of the data input device of FIG. 6A.

The controller 9 cooperates with the address generator 8 to exhibit a combined function for sequentially generating a combination of a first address data designating an address (j, i) in the memory area 7a of the dual-port memory 7 and a second address data designating an address (k, i) in the memory area 5a of the image memory 5, as shown by a flowchart of FIG. 8.

In FIG. 8, a program flow starts at a step S100.

At a decision step S101, the control section 9a reads the parametric value $S_0$ of the status signal 106 to thereby judge whether or not the internal switch of the sensor 6 is turned on.

In the case $S_0=1$ (on-state), an inversion flag S is set to be "1" at a step S102. But, in the case $S_0=0$ (off-state), the flag S is reset to be "0", or left as it is "0", at a step S103.

In either case, the flow goes to a step S104, where the row number j in the address matrix {(j, i)} of the memory area 7a is set to 1.

Then, at a decision step S105, the flag S is checked whether it is "1" or "0".

In the case the flag S is "1", the row number k in the address matrix {(k, i)} of the memory area 5a is set to M at a step S106. But, in the case the flag S is "0", the row number k is set to 1 at a step S107.

In either case, the flow goes to a step S108, where the column number i of the address matrix {(j, i)} and that of the address matrix {(k, i)} are set to 1, respectively.

At a step S109, the first address data designating the address (j, i) and the second address data designating the address (k, i) are generated and outputted to the dual-port memory 7 and the image memory 5, respectively, so that an image data having been stored in a memory element P(j, i) of the memory area 7a is read therefrom, transferred through the I/O section 9b, and written in a memory element Q(k, i) of the memory area 5a.

Then, at a decision step S110, the current column number i is compared with the maximum column number N to check if i is equal to N.

If i<N at the step S110, the column number i is incremented such that i=i+1, at a step S111, then the flow again goes to the step S109.

If i=N at the step S110, an associated horizontal sweep should have been completed. Then, the flow goes to another decision step S112, where the current row number j in the address matrix {(j, i)} is compared with the maximum row number M to check if j is equal to M.

If j=M at the step S112, an associated vertical scan should have been completed so that a set of image data corresponding to an arbitrary one shot should have been read.

Then, the flow again goes to the step S101, to start reading a subsequent set of image data.

If j<M at the step S112, the row number j is incremented such that j=j+1, at a step S113. Then, the flow goes to still another decision step S114, where the inversion flag S is checked whether it is "1" or "0".

In the case the flag S is "1", the row number k in the address matrix {(k, i)} is decremented such that k=k-1, at a step S115. In the case the flag S is "0", the row number k is incremented such that k=k+1, at a step S116.

In either case, the flow again goes to the step S108, to thereby start a subsequent horizontal sweep.

The present embodiment, which includes the dual-port memory 7 as an auxiliary memory, may be modified so that the read access order to the memory 7 may be changed in accordance with the parametric value $S_0$ of the status signal 106 to thereby partially assist or fully substitute for the selection of write access order to the image memory 5.

In that modification, the vertical scan covering all rows of the address matrix {(j, i)} for the memory 7 and that of the address matrix {(k, i)} for the memory 5 may have their senses of access order selected or controlled as a whole to finally invert a picked up image in accordance with the status signal 106. For example, while $S_0=1$, the vertical scan in the memory 7 may be kept inverted, with the sense of vertical scan in the memory 5 left as it is normal. A phase-division or time-division concept may be incorporated to the sharing of scan sense inversion control between the memories 5 and 7.

It will be understood that the dual-port memory 7 may be replaced by a number of memory blocks or areas in the image memory 5.

Moreover, the present embodiment as well as the modification or variations thereof may be preferably modified to permit a mode selection beween a normal mode and a mirror mode, exemplarily by provision of a mode select switch, like the preceding embodiment.

In this modification, the horizontal sweep along each or particular row of the address matrix {(j, i)} for the memory 7 and that along each or particular row of the address matrix {(k, i)} for the memory 5 may have their senses of access order selected or controlled as a whole to finally reverse a picked up image in accordance with the status signal 106.

In a variation of the latter modification of the present embodiment, while $S_0=0$, the horizontal sweep in the memory 5 or in the memory 7, as it is or as replaced partially or wholly, may have a normal sense in the normal mode and may be reversed from the normal sense to an opposite sense in the mirror mode.

In another variation, while $S_0=1$, the horizontal sweep in the memory 5 or in the memory 7, as it is or as replaced partially or wholly, may have a normal sense in the normal mode and may be reversed from the normal sense to an opposite sense in the mirror mode.

In still another variation, the foregoing two variations may be combined, partially or wholly. A phase-division or time-division concept may be incorporated to the sharing of sweep sense reverse control between the memories 5, 7.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data input device for inputting to an image memory a set of image data of an object picked up by and received from a camera installed on a camera mount, said camera having a shooting angle thereof variable in accordance with an operational state of said camera mount, said device comprising:

a sensor means for sensing the operational state of said camera mount to detect thereby the shooting angle of said camera; and a write means for writing to store the set of image data in said image memory, in accordance with a selected order from among a plurality of defined orders of a write access to said image memory, depending on an output of said sensor means, so that an inverted image of said object when picked up by said camera is inverted when the set of image data is stored in said image memory.

2. A data input device according to claim 1, wherein:

said image memory is addressed in a matrix form with a number of rows and a number of columns;

said plurality of defined orders include a first access order in which said number of rows are accessed in accordance with a given order thereof, and a second access order in which said number of rows are accessed in a reverse order to the given order; and said write means has, as said selected order, the first access order when the shooting angle of said camera is substantially equal to a dip of zero degrees, and the second access order when the shooting angle of said camera is substantially equal to a dip of a right angle.

3. A data input device according to claim 2, wherein:

said number of columns in each of said number of rows are accessed, in the first access order, in accordance with a predetermined order thereof and, in the second access order, in a reverse order to the predetermined order so that the inverted image of said object when picked up by said camera is inverted and reversed when the set of image data is stored in said image memory.

4. A data input device according to claim 1, wherein:

said camera mount has a pivotable arm member for supporting said camera; and the operational state of said camera mount is defined by a declination of said arm member.

5. A data input device according to claim 1, wherein said write means comprises:

a dual-port memory for storing the set of image data received from said camera;

a control means having therein said plurality of defined orders, for responding to the output of said sensor means to determine as said selected order one of said plurality of defined orders;

an address generator for responding to said selected order to generate a sequence of addresses designating a plurality of memory locations in said dual-port memory and another sequence of addresses designating a plurality of memory locations in said image memory; and an input-output means for inputting the set of image data as a datastream from said plurality of memory locations in said dual-port memory and to output the datastream to said plurality of memory locations in said image memory.

6. A data input method for inputting to an image memory a set of image data of an object picked up by and received from a camera installed on a camera mount, said camera having a shooting angle thereof variable in accordance with an operational state of said camera mount, said method comprising the steps of:

sensing the operational state of said camera mount, thereby detecting the shooting angle of said camera; and writing to store the set of image data in said image memory, in accordance with a selected order from among a plurality of defined orders of a write access to said image memory, depending on a result of said sensing, so that an inverted image of said object when picked up by said camera is inverted when the set of image data is stored in said image memory.

7. A data input method according to claim 6, further comprising the steps of:

addressing said image memory in a matrix form with a number of rows and a number of columns;

having said plurality of defined orders, including a first access order in which said number of rows are accessed in accordance with a given order thereof, and a second access order in which said number of rows are accessed in a reverse order to the given order; and having, as said selected order, the first access order when the shooting angle of said camera is substantially equal to a dip of zero degrees, and the second access order when the shooting angle of said camera is substantially equal to a dip of a right angle.

8. A data input method according to claim 7, wherein:

said number of columns in each of said number of rows are accessed, in the first access order, in accordance with a predetermined order thereof and, in the second access order, in a reverse order to the predetermined order so that the inverted image of said object when picked up by said camera is inverted and reversed when the set of image data is stored in said image memory.

* * * * *